United States Patent [19]

Carter et al.

[11] Patent Number: 5,229,025
[45] Date of Patent: Jul. 20, 1993

[54] LUBRICATION AND A METHOD OF RETROFILLING A WORKING FLUID/LUBRICANT COMPOSITION

[75] Inventors: Brian H. Carter; Barry D. Greig, both of Reading, England

[73] Assignee: Castrol Limited, England

[21] Appl. No.: 734,481

[22] Filed: Jul. 23, 1991

[30] Foreign Application Priority Data

Jul. 23, 1990 [GB] United Kingdom ............... 9016085

[51] Int. Cl.$^5$ .............................................. C09K 5/04
[52] U.S. Cl. ........................................ 252/68; 252/67
[58] Field of Search .................................... 252/67, 68

[56] References Cited

U.S. PATENT DOCUMENTS

| | | | |
|---|---|---|---|
| 2,807,155 | 9/1957 | Williamitis | 62/117.7 |
| 4,851,144 | 7/1989 | McGraw et al. | 252/67 |
| 5,021,179 | 6/1991 | Zehler et al. | 252/68 |

FOREIGN PATENT DOCUMENTS

| | | |
|---|---|---|
| 0406479A1 | 1/1991 | European Pat. Off. . |
| 0415778A1 | 3/1991 | European Pat. Off. . |
| 0430657A1 | 6/1991 | European Pat. Off. . |
| 2216541A | 10/1989 | United Kingdom . |
| WO90/05172 | 5/1990 | World Int. Prop. O. . |
| WO90/06979 | 6/1990 | World Int. Prop. O. . |
| WO90/12849 | 11/1990 | World Int. Prop. O. . |

*Primary Examiner*—Ellen McAvoy
*Attorney, Agent, or Firm*—Bacon & Thomas

[57] ABSTRACT

The use of mixtures of 1,1,1,2-tetrafluoroethane and an ester having a molecular weight of greater than 250 as retrofill working fluid/lubricant combinations for mechanical vapor recompression heat transfer devices. Despite the presence of residual lubricant, e.g. hydrocarbon lubricants, from working fluid/lubricant combinations in which working fluids such as R12, R22, R502 or R511 are used, anticipated problems resulting from immiscibility such as excessive wear have not been observed.

12 Claims, No Drawings

LUBRICATION AND A METHOD OF RETROFILLING A WORKING FLUID/LUBRICANT COMPOSITION

This invention concerns the lubrication of mechanical vapor recompression type heat transfer devices, and especially those using the working fluid 1,1,1,2-tetrafluoroethane.

The search for working fluids to replace chlorofluorocarbons and hydrofluorocarbons, which are believed to cause damage to atmospheric ozone, has identified 1,1,1,2-tetrafluoroethane. However, lubricants which are suitable for use with chlorofluorocarbons and hydrofluorocarbons in heat transfer devices are in general unsuitable for use with 1,1,1,2-tetrafluoroethane due to their lack of miscibility with the latter. Typical lubricants used in mechanical vapor recompression type heat transfer devices using chlorofluorocarbons or hydrofluorocarbons as the working fluid and which are not fully miscible with 1,1,1,2-tetrafluoroethene include alkyl benzenes and mineral oils.

Various alternative lubricants have been proposed for use with 1,1,1,2-tetrafluoroethane, for example polyoxyalkylenes and their mono- and di-ethers. Certain esters have also been proposed for use as lubricants with 1,1,1,2-tetrafluoroethane as a working fluid.

Although lubricants have now been proposed for use with 1,1,1,2-tetrafluoroethene, many are immiscible with chlorofluorocarbons and hydrofluorocarbons. This doesn't present the manufacturers of original equipment with a problem, as such equipment will be filled from empty. However, it is often necessary to refill mechanical vapor recompression type heat transfer devices with a new charge of lubricant and/or working fluid, and it would be expected that in order to avoid problems due to immiscibility, for example unacceptable wear in parts of the devices, resulting from residual lubricant and/or chlorofluorocarbon and hydrofluorocarbon working fluid all of the residual material would have to be removed from the devices. In such so-called "retrofill" situations it would therefore be expected that the devices would either have to be completely drained or the original or a similar chlorofluorocarbon or hydrofluorocarbon/lubricant mixture would have to be used.

The present invention provides the use of a mixture of 1,1,1,2-tetrafluoroethane and an ester having a molecular weight of greater than 250 as a retrofill working fluid/lubricant combination for a mechanical vapor recompression heat transfer device.

The present invention is of particular use in "retrofill" situations in which the previous lubricant was, for example, an alkyl benzene or a mineral oil. Typically the working fluid used with such lubricants would be refrigerants R12, R22, R502 or R511.

Despite the presence of residual lubricant which is at least partially immiscible with 1,1,1,2-tetrafluoroethane, anticipated problems resulting from its immiscibility such as excessive wear, have not been observed, particularly if the amount of the original lubricant amounts to no more than about 5 percent of the lubricant present following the "retrofill".

Although in accordance with the present invention any of the esters having a molecular weight of greater than 250 disclosed in British Patent Specification 2216541, for example di-(2-ethylhexyl) adpate, tetrabutyl pyromellitate, di-(methoxyethoxyethyl) adipate, di-(methoxyethyl) phthalate, di-(butoxyoxyethyl) phthalate, di-(butoxyethoxyethyl) phthalate, tetra-(butoxyethyl)pyromellitate, or dipropylene glycol benzoate can be used as a lubricant with 1,1,1,2-tetrafluoroethane, it is particularly preferred to use esters of an aliphatic mono-carboxylic acid and an alcohol having at least three hydroxy groups. This preferred class of esters has shown particularly good miscibility with 1,1,1,2-tetrafluoroethane over a wide range of operating temperatures and ratios of working fluid to lubricant, and more particularly they have shown good miscibility combined with low wear in "retrofill" situations. Furthermore, their resistance to copper plating and corrosion has been good.

Miscibility between the preferred class of ester lubricants and 1,1,1,2-tetrafluoroethane can be achieved over a wide range of ratios of lubricant to working fluid even if at least some of the original lubricant remains immiscible. Furthermore, this miscibility is frequently observed at temperatures below the boiling point of 1,1,1,2-tetrafluoroethane ($-28°$ C.). In addition, viscosities of greater than 25cSt at 40° C. have been achieved for combinations of certain esters with 1,1,1,2-tetrafluoroethane.

The alcohols from which the preferred class of lubricant esters are derived can be tri-hydric, for example glycerol or tri-methylol propane, or tetra- or higher hydric, for example pentaerythritol or di-pentaerythritol. Pentaerythritol is particularly preferred as it provides esters which exhibit miscibility to particularly low temperatures, combined with satisfactory viscosities at elevated temperatures.

The aliphatic mono-carboxylic acids from which the preferred class of esters are derived are preferably saturated. In addition, they preferably have a relatively short carbon chain, for example containing from 4 to 12 carbon atoms. The length of the carbon chain can affect the miscibility of the esters with 1,1,1,2-tetrafluoroethane, as can the degree of branching of the carbon chain. In general, it is preferred that acids having an un-branched carbon chain should contain from 4 to 8 carbon atoms, where as acids having a branched carbon chain should contain from 4 to 12 or possibly more carbon atoms. Branching of the acid affects the miscibility of the esters with 1,1,1,2-tetrafluoroethane.

In a particularly preferred embodiment of the present invention mixtures of esters are used in which an ester derived from an unbranched aliphatic carboxylic acid is used in admixture with an ester derived from a branched aliphatic carboxylic acid. Especially preferred are mixtures of esters derived from n-pentanoic acid and from iso-nonanoic acid, and more especially mixtures of esters of such acids with pentaerythritol. These esters can be used in various proportions, the physical properties of the mixtures generally varying with the relative amounts of the esters in the mixtures.

Esters and their mixtures used in accordance with the present invention preferably have viscosities in the range of from 10 to 200cSt, particularly from 15 to 120cSt, at 40° C. The lowest compatible solution temperatures of the esters and their mixtures used in accordance with the present invention with complete miscibility with 1,1,1,2-tetraflurorethene are usually less than 0° C. and frequently below $-28°$ C. The pour points of the esters and their mixtures are preferably less than $-21°$ C. and in some cases less than $-40°$ C. The esters and their mixtures often have a viscosity index of greater than 50, and the viscosity index can be in the range of from 75 to 140.

The preferred esters can be prepared by known methods. For example they can be prepared by reacting one or more alcohols containing the desired alcohol moieties with one or more acids containing the desired acid moieties. Mixtures of acids can therefore be prepared by reacting one or more alcohols with one or more acids. However, mixture of esters can also be prepared by mixing individual esters which have been prepared separately.

The lubricant/working fluid combinations used in accordance with the present invention can be produced by known methods, in particular by simply mixing the ester or esters with 1,1,1,2-tetrafluoroethene, this mixing being conveniently effected within the mechanical vapor recompression type heat transfer device by charging them separately to the devices although they can be charged in admixture. It is particularly convenient to charge the combination to such a device which has been roughly vented of its original lubricant/working fluid combination. However, the ester containing combination can be used to top up a chlorofluorocarbon or hydrofluorocarbon/lubricant combination. It will therefore be appreciated that the present invention has wide applicability to "retrofill" situations.

The following Examples are given by way of illustration only. All parts are percentages by weight unless indicated otherwise.

EXAMPLE 1

A mixture of esters of pentaerythritol with pentanoic acid and heptanoic acid (C5:C7 moiety ratio 34:66) was prepared in known manner by reacting the polyol with a mixture of the activated acids. The resulting mixture of esters (vI 130; viscosity at 40° C., 20.5; pour point, −60° C.) and 1,1,1,2-tetrafluoroethane were then subjected for 500 hours to the standard test procedure of the European Committee of Manufacturers of Refrigeration Equipment (CECED 500 test). At the end of the test, the compressor showed no signs of copper plating, corrosion or appreciable wear.

EXAMPLE 2

The mixture of esters used in Example 1 was used as a lubricant with the refrigerant R12 containing 1000ppm of 1,1,1-trichloroethane in the CECED 500 test. At the end of the test, the compressor showed no signs of copper plating, corrosion or appreciable wear.

EXAMPLE 3

A compressor was subjected to the CECED 500 test, the first 150 hours of the test being conducted using a mixture of mineral oil and R12, following which, after draining off the lubricant/working fluid combination, the remaining 350 hours of the test were conducted using the lubricant/working fluid combination of Example 1. At the end of the test, the compressor showed no signs of copper plating, corrosion or appreciable wear.

EXAMPLE 4

A compressor was subjected to the CECD 500 test, the mixture of lubricants prepared in Example 1 being used as a lubricant for a working fluid consisting of a 50:50 mixture by weight of R12 and R134a. At the end of the test, the compressor showed no signs of copper plating, corrosion or appreciable wear.

We claim:

1. A method of retrofilling a working fluid/lubricant composition containing chlorofluorocarbons or hydrofluorocarbons as the working fluid and an alkyl benzene or a mineral oil as the lubricant in a mechanical vapor recompression heat transfer device comprising replacing most, but not all, of the working fluid/lubricant composition containing chlorofluorocarbons or hydrofluorocarbons in said device with a mixture of 1,1,1,2-tetrafluoroethane as the working fluid and as ester having a molecular weight greater than 250 as the lubricant.

2. The method according to claim 1, wherein the of ester is of an aliphatic mono-carboxylic acid and an alcohol having at least three hydroxy groups.

3. The method according to claim 2, wherein the alcohol comprises pentaerythritol.

4. The method according to claim 2, wherein the acid is a saturated aliphatic mono-carboxylic acid.

5. The method according to claim 2, wherein the acid contains from 4 to 12 carbon atoms.

6. The method according to claim 2, wherein the acid has an unbranched carbon chain.

7. The method according to claim 6, wherein the acid contains from 4 to 8 carbon atoms.

8. The method according to claim 2, wherein the acid has a branched carbon chain.

9. The method according to claim 8, wherein the acid contains from 5 to 9 carbon atoms.

10. The method according to claim 2, including two or more of the said esters.

11. The method according to claim 10, wherein the ester comprises di-(2-ethylhexyl) adpate, tetra-butyl pyromellitate, di-(methoxyethoxyethyl) adipate, di-(methoxyethyl) phthalate, di-(butoxyoxyethyl) phthalate, di-(butoxyethoxyethyl) phthalate, tetra-(butoxyethyl)-pyromellitate, or dipropylene glycol benzoate.

12. The method according to claim 11, wherein the mechanical vapor recompression heat transfer device has previously been filled with a lubricant/working fluid combination comprising an alkyl benzene or mineral oil as a lubricant.

* * * * *